US010819112B1

(12) United States Patent
Pan et al.

(10) Patent No.: US 10,819,112 B1
(45) Date of Patent: Oct. 27, 2020

(54) FEEDER LINE FAULT RESPONSE USING DIRECT CURRENT INTERCONNECTION SYSTEM

(71) Applicant: ABB Schweiz AG, Baden (CH)

(72) Inventors: Jiuping Pan, Raleigh, NC (US); Chunming Yuan, Beijing (CN); Xiaobo Yang, Beijing (CN); Ritwik Majumder, Västerås (SE); Bertil Berggren, Västerås (SE); Frans Dijkhuizen, Västerås (SE); David Schaeffer, Västerås (SE)

(73) Assignee: ABB Schweiz AG, Baden (CH)

( * ) Notice: Subject to any disclaimer, the term of this patent is extended or adjusted under 35 U.S.C. 154(b) by 20 days.

(21) Appl. No.: 16/366,118

(22) Filed: Mar. 27, 2019

(30) Foreign Application Priority Data

Mar. 27, 2019 (CN) .......................... 2019 1 0235060

(51) Int. Cl.
*H02J 3/00* (2006.01)
*H02J 3/36* (2006.01)
*H02J 3/06* (2006.01)

(52) U.S. Cl.
CPC ............ *H02J 3/0073* (2020.01); *H02J 3/001* (2020.01); *H02J 3/00125* (2020.01); *H02J 3/06* (2013.01); *H02J 3/36* (2013.01)

(58) Field of Classification Search
CPC ...... H02J 3/001; H02J 3/00125; H02J 3/0073; H02J 3/06; H02H 7/26; H02H 7/261; H02H 7/262
See application file for complete search history.

(56) References Cited

U.S. PATENT DOCUMENTS 6,459,998 B1 10/2002 Hoffman
9,698,589 B1 7/2017 Leyh
(Continued)

FOREIGN PATENT DOCUMENTS

CA 2910713 A1 5/2016
CA 2913441 A1 5/2016
(Continued)

OTHER PUBLICATIONS

Gers, Juan, and Carlo Viggiano. "Reliability and Flexibility Criteria to Locate Motor Operated Switches in Distribution Systems." 2018 IEEE Andescon. IEEE, 2018. (Year: 2018).*
(Continued)

*Primary Examiner* — Ryan Johnson
(74) *Attorney, Agent, or Firm* — Slater Matsil, LLP

(57) ABSTRACT

Systems, methods, techniques and apparatuses of feeder line fault response are disclosed. One exemplary embodiment is a method for operating an alternating current (AC) distribution network including a first feeder line, a second feeder line, and a third feeder line. The method includes isolating a faulted portion of the first feeder line from a healthy portion of the first feeder line; closing a tie switch coupled between the healthy portion and the second feeder line in response to isolating the faulted portion from the healthy portion; determining the second feeder line is experiencing an overload condition after closing the tie switch; and transferring AC power including transferring AC power using a direct current (DC) interconnection system coupled to the third feeder line effective to remove the overload condition from the second feeder line.

23 Claims, 4 Drawing Sheets

(56) References Cited

U.S. PATENT DOCUMENTS

| | | |
|---|---|---|
| 9,893,633 B1 | 2/2018 | Li et al. |
| 2002/0012210 A1 | 1/2002 | Morris et al. |
| 2005/0168891 A1 | 8/2005 | Nilman-Johansson et al. |
| 2013/0024033 A1* | 1/2013 | Fan .................. H02J 3/0073 700/291 |
| 2015/0349655 A1 | 12/2015 | Petersen et al. |
| 2016/0056729 A1 | 2/2016 | Tenca |
| 2016/0146192 A1 | 5/2016 | Kurthakoti Chandrashekhara et al. |
| 2016/0181802 A1 | 6/2016 | Jacobson et al. |
| 2016/0336928 A1 | 11/2016 | Kuznetsov |
| 2016/0380429 A1 | 12/2016 | Krstic |
| 2017/0077699 A1 | 3/2017 | Kondabathini et al. |
| 2017/0077746 A1 | 3/2017 | Kanakasabai et al. |
| 2017/0110969 A1 | 4/2017 | Zhou et al. |
| 2017/0141694 A1 | 5/2017 | Keister et al. |
| 2017/0338651 A1 | 11/2017 | Fishman et al. |
| 2017/0338748 A1 | 11/2017 | Liang et al. |
| 2017/0346398 A1 | 11/2017 | Long et al. |
| 2018/0006570 A1 | 1/2018 | Keister et al. |

FOREIGN PATENT DOCUMENTS

| | | |
|---|---|---|
| CN | 201457837 U | 5/2010 |
| CN | 102545200 A | 7/2012 |
| CN | 202840667 U | 3/2013 |
| CN | 104218805 A | 12/2014 |
| CN | 104320000 A | 1/2015 |
| CN | 104333033 A | 2/2015 |
| CN | 104485821 A | 4/2015 |
| CN | 104539187 A | 4/2015 |
| CN | 102938564 B | 5/2015 |
| CN | 204333981 U | 5/2015 |
| CN | 204391761 U | 6/2015 |
| CN | 104852583 A | 8/2015 |
| CN | 105023058 A | 11/2015 |
| CN | 105634273 A | 6/2016 |
| CN | 105719196 A | 6/2016 |
| CN | 105762790 A | 7/2016 |
| CN | 105790294 A | 7/2016 |
| CN | 205430053 U | 8/2016 |
| CN | 205544542 U | 8/2016 |
| CN | 106099900 A | 11/2016 |
| CN | 106229984 A | 12/2016 |
| CN | 106356834 A | 1/2017 |
| CN | 106357138 A | 1/2017 |
| CN | 106451439 A | 2/2017 |
| CN | 106505558 A | 3/2017 |
| CN | 106602608 A | 4/2017 |
| CN | 206117151 U | 4/2017 |
| CN | 104934972 B | 5/2017 |
| CN | 106655267 A | 5/2017 |
| CN | 106711994 A | 5/2017 |
| CN | 106712561 A | 5/2017 |
| CN | 106786598 A | 5/2017 |
| CN | 206302343 U | 7/2017 |
| CN | 107070249 A | 8/2017 |
| CN | 107086787 A | 8/2017 |
| CN | 107086806 A | 8/2017 |
| CN | 107104416 A | 8/2017 |
| CN | 107257121 A | 10/2017 |
| CN | 107332443 A | 11/2017 |
| CN | 107565834 A | 1/2018 |
| CN | 107592017 A | 1/2018 |
| CN | 107612012 A | 1/2018 |
| CN | 107681886 A | 2/2018 |
| CN | 107706905 A | 2/2018 |
| CN | 107733244 A | 2/2018 |
| CN | 107786099 A | 3/2018 |
| CN | 107800298 A | 3/2018 |
| CN | 107800299 A | 3/2018 |
| CN | 107834854 A | 3/2018 |
| CN | 107863884 A | 3/2018 |
| CN | 107887924 A | 4/2018 |
| CN | 107947146 A | 4/2018 |
| CN | 107968570 A | 4/2018 |
| CN | 107968572 A | 4/2018 |
| CN | 207339264 U | 5/2018 |
| EP | 0333139 A1 | 9/1989 |
| EP | 2996237 A1 | 3/2016 |
| EP | 3018794 A1 | 5/2016 |
| EP | 3062434 A1 | 8/2016 |
| EP | 3109992 A1 | 12/2016 |
| IN | 1246/CHE/2013 A | 9/2013 |
| JP | 2001298850 A | 10/2001 |
| JP | 2002191105 A | 7/2002 |
| JP | 2007020373 A | 1/2007 |
| JP | 2012029501 A | 2/2012 |
| KR | 20160040378 A | 4/2016 |
| KR | 20160081067 A | 7/2016 |
| WO | 2012116748 A1 | 9/2012 |
| WO | 2015090365 A1 | 6/2015 |
| WO | 2016054412 A1 | 4/2016 |
| WO | 2017058253 A1 | 4/2017 |
| WO | 2018041338 A1 | 3/2018 |
| WO | 2018072837 A1 | 4/2018 |
| WO | 2018079905 A1 | 5/2018 |

OTHER PUBLICATIONS

Park, So-young, et al. "A fault detection and service restoration method by shifting the feeder tie switch for ungrounded distribution system." 2008 International Conference on Condition Monitoring and Diagnosis. IEEE, 2008. (Year: 2008).*

Chen, Dong, Lie Xu, and Wendian Zhang. "Active distribution power system with multi-terminal DC links." IET Renewable Power Generation 11.1 (2016): 27-34. (Year: 2016).*

A. Shekhar et al., "Reconfigurable DC Links for Restructuring Existing Medium Voltage AC Distribution Grids," Electric Power Components and Systems, dated Jan. 16, 2018, last accessed Oct. 4, 2018, available at https://www.tandfonline.coM/doi/pdf/10.1080/15325008.2017.1346005?needAccess=true.

X.B. Guo et al., "A Coordinated Optimization Method of SNOP and Tie Switch Operation Simultaneously Based on Cost in Active Distribution Network," CIRED Workshop 2016, dated Feb. 23, 2017, 4 pages, IET, New Jersey, USA.

* cited by examiner

■ = Closed Switching Device
□ = Open Switching Device

FEEDER LINE FAULT RESPONSE USING DIRECT CURRENT INTERCONNECTION SYSTEM

BACKGROUND

The present disclosure relates generally to medium voltage alternating current (MVAC) distribution networks. Isolating a fault in a feeder line of an MVAC distribution network may cause a healthy portion of a feeder line to be disconnected from all power sources. Network control systems may be able to reconnect the healthy portion to another feeder line using controllable switches such as tie switching devices coupled to the end of each feeder line. Existing MVAC distribution networks suffer from a number of shortcomings and disadvantages. There remain unmet needs including increasing reconfigurability following feeder line fault response, preventing subsequent overloads after network reconfigurations, and reducing network downtime for healthy feeder line portions. For instance, conventional distribution networks do not receive power from multiple connected feeder lines after a fault response, risking an overload in a single newly connected feeder line and reducing power transfer ability. In view of these and other shortcomings in the art, there is a significant need for the unique apparatuses, methods, systems and techniques disclosed herein.

DISCLOSURE OF ILLUSTRATIVE EMBODIMENTS

For the purposes of clearly, concisely and exactly describing non-limiting exemplary embodiments of the disclosure, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the present disclosure is thereby created, and that the present disclosure includes and protects such alterations, modifications, and further applications of the exemplary embodiments as would occur to one skilled in the art with the benefit of the present disclosure.

SUMMARY OF THE DISCLOSURE

Exemplary embodiments of the disclosure include unique systems, methods, techniques and apparatuses for feeder line fault response in a medium voltage distribution network. Further embodiments, forms, objects, features, advantages, aspects and benefits of the disclosure shall become apparent from the following description and drawings.

DETAILED DESCRIPTION OF ILLUSTRATIVE EMBODIMENTS

Figure 1:
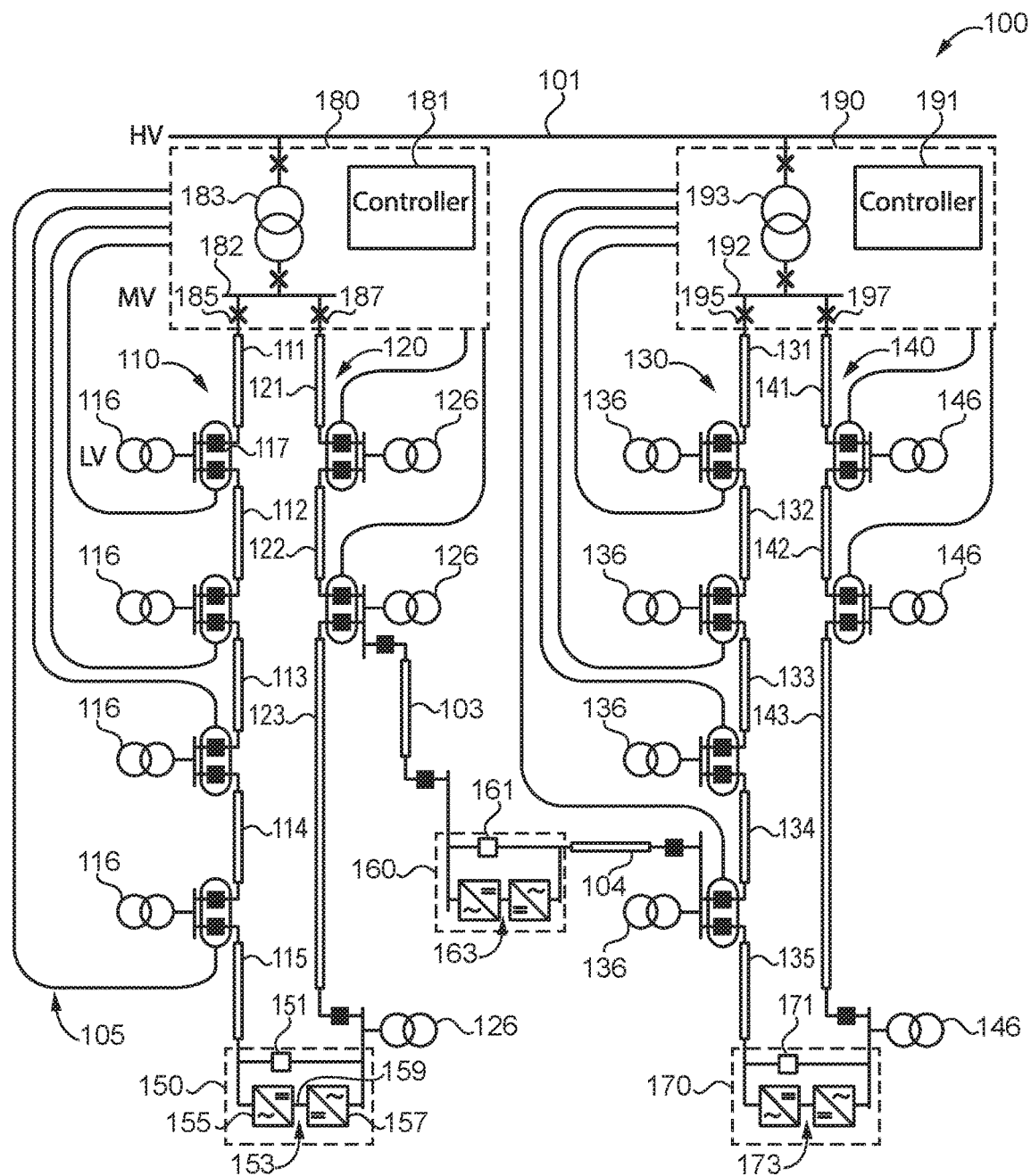
FIG. 1 illustrates an exemplary medium voltage distribution network.

With reference to FIG. 1, there is illustrated an exemplary medium voltage alternating current (MVAC) distribution network 100 structured to receive high voltage alternating current (HVAC) power from a power transmission network line 101 and provide MVAC power through feeder lines to medium voltage loads or medium voltage/low voltage (MV/LV) substations coupled to the feeder lines. It shall be appreciated that, for certain applications, medium voltage refers to a voltage greater than or equal to 1 kV and less than 100 kV, and low voltage refers to a voltage less than 1 kV. For certain other applications, medium voltage refers to a voltage greater than or equal to 1 kV and less than or equal to 72 kV, and low voltage refers to a voltage less than 1 kV. It shall also be appreciated that the topology of network 100 is illustrated for the purpose of explanation and is not intended as a limitation of the present disclosure. Although network 100 is illustrated with a single line diagram, network 100 may be structured to transmit single-phase or multiphase power.

Network 100 includes high voltage/medium voltage (HV/MV) substations 180 and 190 coupled to a high voltage transmission network including line 101. Substation 180 includes a step down transformer 183 coupled to line 101, an MV bus 182 coupled to transformer 183, and switching devices 185 and 187 coupled to bus 182. Step down transformer 183 is structured to receive HVAC power from line 101, step down the high voltage of the HVAC power to medium voltage, and output MVAC power to MV bus 182. Switching devices 185 and 187 are structured to selectively open so as to isolate feeder lines 110 and 120, respectively, from MV bus 182. For example, switching devices 185 and 187 may be structured to open in response to detecting a fault in a corresponding feeder line. It shall be appreciated that the switching devices of network 100, including switching devices 185 and 187, may include a circuit breaker, a disconnector switch, or any other type of switching device structured to interrupt or prevent the flow of current in an MVAC distribution network.

Substation 180 includes an HV/MV substation controller 181 structured to communicate with wide area controllers, such as a supervisory control and data acquisition (SCADA) system or system operator; controllable devices within network 100 including switching devices 185 and 187, or tie switching devices 151 and 161; a plurality of measuring devices 105 within network 100; and direct current (DC) interconnection systems 153 and 163. Substation controller 181 is structured to operate the controllable devices of network 100, such as switching devices or DC interconnection systems, in response to receiving instructions or information from a wide area controller, receiving instructions or information from DC interconnection systems of network 100, or in response to detecting a fault within network 100, to name but a few examples. It shall be appreciated that any or all of the foregoing features of substation 180 may also be present in the other HV/MV substations disclosed herein.

Substation 190 includes a step down transformer 193 coupled to line 101, an MV bus 192 coupled to transformer 193, and switching devices 195 and 197 coupled to bus 192. Step down transformer 193 is structured to receive HVAC power from line 101, step down the high voltage of the HVAC power to medium voltage, and output MVAC power to MV bus 192. Substation 190 also includes an HV/MV substation controller 191 structured to communicate with DC interconnection systems 163 and 173 and tie switching devices 161 and 171.

Network 100 includes feeder lines 110 and 120 coupled to substation 180. Feeder line 110 includes a first end coupled to switching device 185 and a second end coupled to a line end interconnection system 150. Feeder line 110 includes line segments 111-115 coupled together at connection points 116 by way of switching devices such as switching device 117. The connection points of network 100 may include a medium voltage/low voltage (MV/LV) substation, power generation sources, or a medium voltage load, to name but a few examples. Feeder line 120 includes a first end coupled to switching device 187 and a second end coupled to a feeder line end interconnection system 150. Feeder line 120 includes line segments 121-123 coupled together at connection points 126 by way of switching devices.

Network 100 includes feeder lines 130 and 140 coupled to substation 190. Feeder line 130 includes a first end coupled to switching device 195 and a second end coupled to an interconnection system 170. Feeder line 130 includes line segments 131-135 coupled together at connection points 136 by way of switching devices. Feeder line 140 includes a first end coupled to switching device 197 and a second end coupled to a line end interconnection system 170. Feeder line 140 includes line segments 141-143 coupled together at connection points 146 by way of switching devices. A line end interconnection system 160 is coupled between feeder lines 120 and 130 by way of line segments 103 and 104.

Each line segment of network 100 has a rated power capacity, a rated voltage capacity, and a rated current capacity. Line segments of the same feeder line may have different rated capacities. The difference between a rated current capacity and the amount of current flowing through a line segment is called headroom. In other embodiments, headroom may be related to the rated power capacity or the rated voltage capacity of a line segment.

In the illustrated embodiment, a plurality of measuring devices 105 are structured to measure electrical characteristics of each line segment. Electrical characteristics include voltage, current, and power, to name but a few examples. In other embodiments, the plurality of measuring devices 105 may only be structured to measure electrical characteristics of the top segment of each feeder line (i.e. segments 111, 121, 131, and 141). The measuring devices of feeder lines 110 and 120 transmit measurement data to substation controller 181, and the measuring devices of feeder lines 130 and 140 transmit measurement data to substation controller 191. In certain embodiments, the plurality of measuring devices 105 are structured to transmit measurement data to a centralized controller structured to operate controllable devices of all feeder lines of network 100 according to a coordinated control solution.

Each interconnection system of network 100 includes a DC interconnection system, also known as an AC/AC power converter, as well as a tie switching device coupled in parallel. The tie switching devices are normally opened such that network 100 is arranged in a radial configuration, as opposed to a meshed configuration. The radial configuration of network 100 generally allows current to flow in one direction from the substation to the end of each feeder line. During normal, i.e. non-faulted, operation, each DC interconnection system may be controlled so as to balance headroom and minimize losses on the feeder lines of the network, thereby reducing power losses and thermal stresses. Line end interconnection system 150 includes DC interconnection system 153 and tie switching device 151. Line end interconnection system 160 includes DC interconnection system 163 and tie switching device 161. Line end interconnection system 170 includes DC interconnection system 173 and tie switching device 171. In certain embodiments, one or more interconnection systems includes a DC interconnection system, but does not include a tie switching device. In certain embodiments, one or more interconnection systems include a tie switching device, but no DC interconnection system.

Each DC interconnection system includes two bidirectional AC/DC power converters structured to convert AC power into DC power and convert DC power into AC power. For example, DC interconnection system 153 includes AC/DC power converters 155 and 157 coupled by a DC link 159. AC/DC power converter 155 is structured to receive AC power from line segment 115 and convert the AC power into DC power. Converter 155 is also structured to receive DC power from AC/DC power converter 157, convert the DC power into AC power, and output the AC power to line segment 115. AC/DC power converter 157 is structured to receive AC power from line segment 123 and convert the AC power into DC power. Converter 157 is also structured to receive DC power from AC/DC power converter 155, convert the DC power into AC power, and output the AC power to line segment 123. In certain embodiments, each AC/DC power converter includes a voltage source converter. In certain embodiments, one voltage source converter is operated to control active power while the other voltage source converter is operated to control DC bus voltage. In certain embodiments, each AC/DC power converter operates to control reactive power or AC voltage. In other embodiments, one or more DC interconnection systems include another bidirectional AC/AC topology, such as a power electronic transformer, to name but one example. It shall be appreciated that any or all of the foregoing features of network 100 may also be present in the other MVAC distribution networks disclosed herein.

Figure 2:
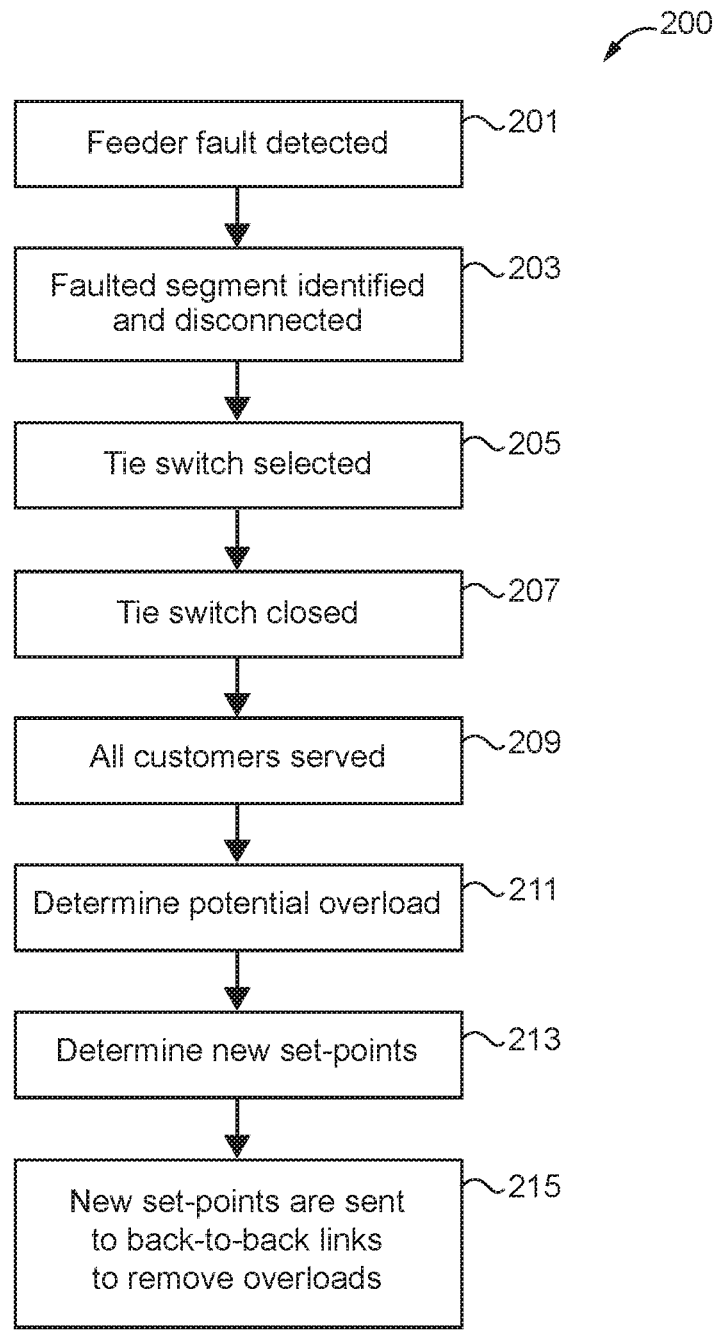
FIG. 2 is a flowchart illustrating an exemplary feeder line fault response process.

With reference to FIG. 2, there is illustrated an exemplary process 200 for responding to a feeder line fault in a medium voltage distribution network. Process 200 is implemented by a network control system including at least one computer readable non-transitory medium and a processing device, which may include a centralized controller, a substation controller, a DC interconnection system controller, or a combination thereof. It shall be further appreciated that a number of variations and modifications to process 200 are contemplated including, for example, the omission of one or more aspects of process 200, the addition of further conditionals and operations, and/or the reorganization or separation of operations and conditionals into separate processes.

Process 200 begins at operation 201 where the network control system detects a feeder line fault in one of the line segments of the medium voltage distribution network. The feeder line fault may be detected by an intelligent electronic device of a substation circuit breaker, a relay, or another type of device in communication with the network control system.

Process 200 proceeds to operation 203 where the fault is located and isolated by opening one or more switching devices. For example, a substation circuit breaker may first isolate the entire feeder line where a fault is occurring. Using isolation devices coupled between line segments of the feeder line, the network control system may isolate the faulted portion of the feeder line from the healthy portion or portions of the feeder line.

Process 200 proceeds to operation 205 where the network control system selects a tie switch to close in order to reconnect a healthy portion of a segmented feeder line to another feeder line receiving power from a power source. For a healthy portion coupled to more than one tie switch, a network control system selects only one of the tie switching devices to close. Closing more than one tie switch would interconnect multiple feeder lines in an uncontrolled manner, making it impossible to control feeder line loading without additional control and protection systems.

The network control system may select the tie switch to close based on circuit breaker statuses and the headroom of adjacent feeder lines. The network control system may also select the tie switch to close using voltages and power flow measured at the DC interconnection systems. In certain embodiments, the tie switch is selected based on the headroom of the adjacent feeder lines and a required voltage profile of the feeder line receiving power.

Process 200 proceeds to operation 207 where the selected tie switch is closed, coupling the healthy portion of the feeder line to the other feeder line. The effect of the coupling is an increased power flow through the coupled feeder line equal to the nominal power flow for the feeder line plus additional power flow for the healthy portion.

Where the tie switch is coupled in parallel with a DC interconnection system in operation, the active power set point for the DC interconnection system is reduced to zero to avoid circulating power, and the reactive power set point or AC voltage set point for the DC interconnection system is set in order to coordinate the reactive power control of AC voltage of both feeder lines coupled to the DC interconnection system. The AC/DC power converters of the DC interconnection system operate as a static compensator coupled in parallel.

Process 200 proceeds to operation 209 where all loads and low voltage distribution networks coupled to healthy portions of the segmented feeder line receive power through the selected tie switch shortly after the fault is isolated. Operation 209 is preferable to partial service restoration, where some loads are restored, but some loads remain disconnected while the faulted cable segment is repaired due to the significant downtime for some loads. Without further action, operation 209 may cause further faults in the distribution network; however, thermal time constants for the line segments are long enough for the following operations 211, 213, 215 to be performed before the overloaded cable experiences a fault.

Process 200 proceeds to operation 211 where the network control system determines at least one of the feeder line segments is overloaded as a result of operation 207. For distribution networks where each feeder line segment of a feeder line has the same cross section, and thereby has the same current capacity, the network control system determines the top segments of the feeder line are being overloaded. For feeder lines with line segments of different cross sections, operation 211 may determine multiple line segments are overloaded.

Process 200 proceeds to operation 213 where the network control system determines operating set points for at least one DC interconnection system using electrical characteristic data available to the network control system. Operating set points may include active power set points, reactive power set points, or AC voltage set points, to name but a few examples. The operating set points are determined so as to extract a controllable amount of power from an adjacent feeder and inject the power into the feeder line with the overload. The amount of the injected power is sufficient to reduce power flow through the overloaded segment in order to eliminate the overload. The operating set points are determined using electrical characteristics of the distribution network, such as voltage and current measurements from one or more feeder lines, and switching devices statuses, to name but a few examples.

In certain embodiments, the active power set points are determined using measurements received before the fault condition. For example, the amount of power flowing through a faulted segment before the fault may be used to determine the active power set point. In certain embodiments, the active power set points are determined using pre-fault and post-fault measurements. Where the distribution network includes measuring devices corresponding to line segments of a feeder line, the set points may be determined so as to maintain a voltage profile throughout the feeder line and reduce line losses. A voltage profile is a set of acceptable voltage ranges at different points on a feeder line. Reactive power set points or AC voltage set points may be set to minimize losses while conforming to current ratings and the voltage ranges of the voltage profile.

In certain embodiments, the network control system uses received measurements to determine the headroom of each available feeder line. The calculated headroom values and circuit breaker statuses are then used to determine the operating set points of the DC interconnection systems. In certain embodiments, the network control system determines operating points, also known as tap changer positions, of on load tap changers of the distribution network, in order to coordinate with the DC interconnection system operation, effective to minimize power losses in the distribution network. In certain embodiments, network control system coordinates DC interconnection system set points with control of other power devices, such as tap changers and breaker connected shunt capacitors using optimal power flow calculations or rule-based algorithms, to name but a few examples.

Process 200 proceeds to operation 215 where the at least one DC interconnection system is controlled so as to transfer power to the healthy portion of the segmented feeder line. The power transferred by the at least one DC interconnection system eliminates the overload in the overloaded segment, preventing a subsequent fault from occurring. The amount of power transferred from the DC interconnection system is structured so as to not cause a future overload in the network as a result of the power transfer. Where multiple DC interconnection systems transfer power in order to eliminate the overload condition, each DC interconnection system provides power effective to at least reduce a magnitude of the overload condition.

Figure 3:
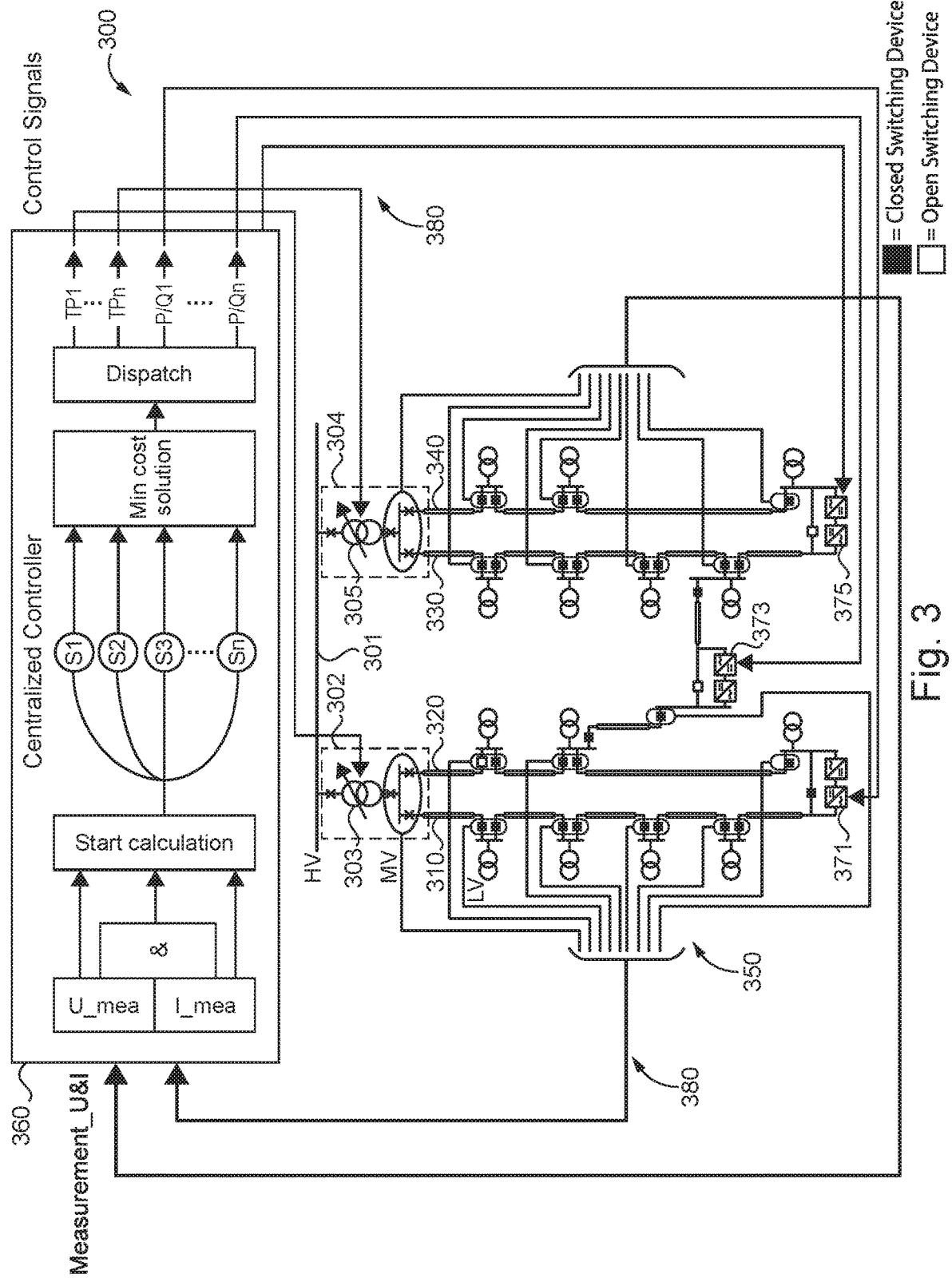
FIG. 3 is an exemplary medium voltage distribution network including a centralized control system.

With reference to FIG. 3, there is illustrated an exemplary medium voltage distribution network 300 including substations 302 and 304 coupled to high voltage transmission line 301. Substation 302 includes an on load tap changer 303 and substation 304 includes an on load tap changer 305. Feeder lines 310 and 320 are coupled to substation 302 and structured to receive MVAC power from substation 302. Feeder lines 330 and 340 are coupled to substation 304 and structured to receive MVAC power from substation 304. Network 300 includes a DC interconnection system 371 coupled between feeder lines 310 and 320, a DC interconnection system 373 coupled between feeder lines 320 and 330, and a DC interconnection system 375 coupled between feeder lines 330 and 340. A plurality of sensing devices 350 are structured to measure electrical characteristics of each line segment of network 300. A plurality of communication channels 380 are structured to transmit measurements from the plurality of sensing device 350 to centralized controller 360, generate a coordinated control strategy, and transmit control signals from controller 360 to the controllable device of network 300 including tap changers 303 and 305, and DC interconnection systems 371, 373, and 375.

Centralized controller 360 is structured to receive a set of measurements from the plurality of sensing devices 350. The measurements may include multiple current measurements for different points on each feeder line, multiple voltage measurements for different points on each feeder line, and circuit breaker statuses for each substation. The voltage measurements and current measurements may be generated by sensing devices located at load points and substation transformers, to give but a few examples.

Once centralized controller 360 receives the set of measurements, controller 360 determines a coordinated control solution for DC interconnection systems 371, 373, and 375, as well as tap changers 303 and 305. Using the set of measurements, controller 360 determines a plurality of possible solutions including possible control signals and an estimated cost of operating network 300. Some solutions may be eliminated due to network conditions identified using the set of measurements, such as isolated segments due to a fault. In certain embodiments, the solutions are determined in parallel. Using the plurality of possible solutions, controller 360 selects one of the solutions effective to minimize operational costs of network 300. Costs considered by controller 360 when selecting a solution include power losses, tap changer life, feeder line life, reliability loss, and power quality loss, to name but a few examples.

Once centralized controller 360 determines the control strategy with the lowest cost, controller 360 generates a plurality of control signals, one control signal for each controllable device of network 300, including the tap changers and DC interconnection systems. The control signals to the tap changers include tap position commands and the control signals to the DC interconnection systems include active power set points and reactive power set points. The control signals are transmitted to the controllable devices via communication channels 380.

Figure 4:
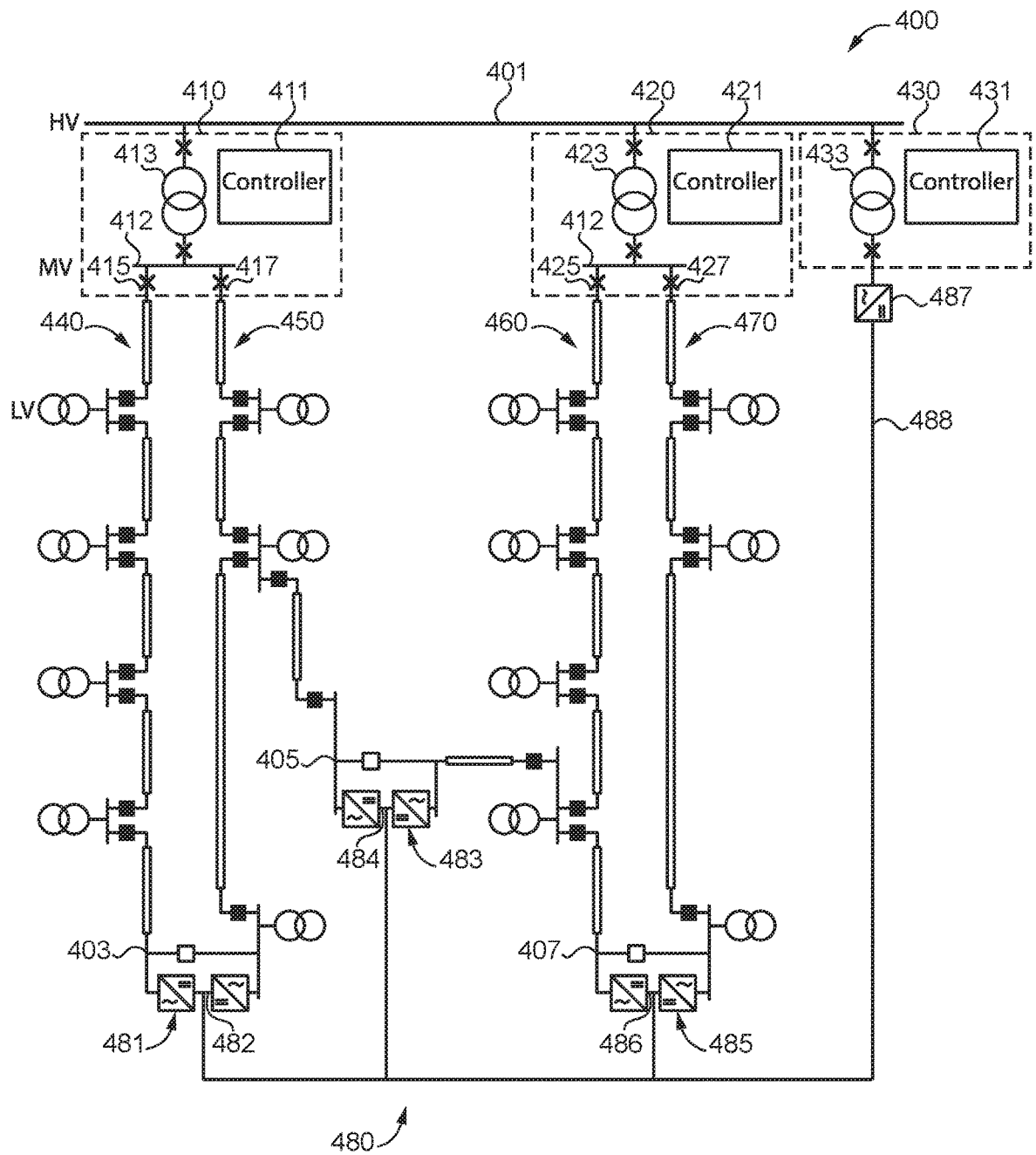
FIG. 4 is an exemplary medium voltage distribution network including an interconnected DC interconnection system network.

With reference to FIG. 4, there is illustrated an exemplary medium voltage distribution network 400 including substations 410, 420, and 430 coupled to high voltage transmission line 401. Substation 410 includes substation controller 411, step down transformer 413, medium voltage bus 412, switching device 415, and switching device 417. Substation 420 includes substation controller 421, step down transformer 423, medium voltage bus 422, switching device 425, and switching device 427. Substation 430 includes substation controller 431 and step down transformer 433.

Network 400 includes feeder lines 440, 450, 460, and 470 coupled to one of the substations of network 400. A first end of feeder line 440 and a first end of feeder line 450 are coupled to substation 410. A first end of feeder line 460 and a first end of feeder line 470 are coupled to substation 420. A second end of feeder line 440 is coupled to a second end of feeder line 450 by way of a switching device 403 and an AC/AC power converter 481. A second end of feeder line 460 is coupled to a second end of feeder line 470 by way of a switching device 407 and AC/AC power converter 485. Feeder line 450 is coupled to feeder line 460 by way of a switching device 405 and an AC/AC power converter 483.

Network 400 includes an interconnected DC interconnection system 480 including AC/AC power converters 481, 483, and 485, and AC/DC power converter 487 coupled together by a DC distribution system 488. Converter 481 includes a DC bus 482 coupled to system 488. Converter 483 includes a DC bus 484 coupled to system 488. Converter 485 includes a DC bus 486 coupled to system 488. AC/DC power converter 487 is structured to receive MVAC power from substation 430, convert the received MVAC power into DC power, and output the DC power to system 488. In certain embodiments, AC/DC power converter 487 is structured to receive DC power from system 488, convert the DC power into MVAC power, and output the MVAC power to substation 430.

Further written description of a number of exemplary embodiments shall now be provided. One embodiment is a method for operating an alternating current (AC) distribution network including a first feeder line, a second feeder line, and a third feeder line, the method comprising: isolating a faulted portion of the first feeder line from a healthy portion of the first feeder line; closing a tie switch coupled between the healthy portion and the second feeder line in response to isolating the faulted portion from the healthy portion; determining the second feeder line is experiencing an overload condition after closing the tie switch; and transferring AC power from the third feeder line using a DC interconnection system coupled to the third feeder line effective to reduce a magnitude of the overload condition of the second feeder line.

In certain forms of the foregoing method, the tie switch is coupled in parallel with a second DC interconnection system including two AC/DC power converters structured to control reactive power between the healthy portion and the second feeder line while the tie switch is closed. In certain forms, the healthy portion is coupled to a plurality of tie switching devices, and wherein closing the tie switch includes selecting the tie switch using a calculated headroom value for the second feeder line. In certain forms, determining the second feeder line is experiencing the overload condition includes determining a rated current of at least one line segment of the second feeder line is exceeded by a current flowing through the at least one line segment, and wherein transferring AC power includes receiving the AC power with the first feeder line effective to reduce the current flowing through the at least one line segment to a current magnitude less than the rated current. In certain forms, transferring AC power includes determining a set point for the DC interconnection system using a plurality of headroom values each corresponding to points on at least one of the first feeder line and second feeder line. In certain forms, transferring AC power includes determining a set point for the DC interconnection system using a voltage profile each corresponding to voltages at points on at least one of the first feeder line and second feeder line. In certain forms, transferring AC power to the first feeder line includes transferring AC power from a second DC interconnection system to the healthy portion, wherein operation of the first DC interconnection system and the second DC interconnection system are coordinated so as to remove the overload condition from the second feeder line and prevent another overload condition from occurring within third feeder line. In certain forms, the AC distribution network includes a tap changer, wherein transferring AC power to the first feeder line includes determining a coordinated solution for the tap changer and the DC interconnection system effective to eliminate the overload condition on the second feeder line, and generating control signals for the tap changer and DC interconnection system using the coordinated solution.

Another exemplary embodiment is an alternating current (AC) distribution network comprising: a first feeder line; a second feeder line; a third feeder line; a tie switch coupled between the first feeder line and the second feeder line; a DC interconnection system coupled to the third feeder line; and a control system structured to isolate a faulted portion of the first feeder line from a healthy portion of the first feeder line, close the tie switch in response to isolating the faulted portion from the healthy portion, detect an overload condition on a segment of the second feeder line; and transfer AC power from the third feeder line using the DC interconnection system effective to reduce a magnitude of the overload condition of the segment of the second feeder line.

In certain forms of the foregoing AC distribution network, the tie switch is coupled in parallel with a second DC interconnection system structured to control reactive power between the healthy portion and the first feeder line while the tie switch is closed. In certain forms, the healthy portion is coupled to a plurality of tie switching devices, and wherein closing the tie switch includes selecting the tie switch using a calculated headroom value for the second feeder line or a circuit breaker status. In certain forms, detecting the overload condition includes determining a rated current of the segment of the second feeder line is exceeded by a current flowing through the segment, and wherein transferring AC power includes receiving the AC power with the first feeder line effective to reduce the current flowing through the segment to a current magnitude less than the rated current. In certain forms, transferring AC power includes determining a set point for the DC interconnection system using a plurality of headroom values each corresponding to points on at least one of the first feeder line and second feeder line. In certain forms, transferring AC power includes determining a set point for the DC interconnection system using a voltage profile each corresponding to voltages at points on at least one of the first feeder line and second feeder line. In certain forms, transferring AC power to the first feeder line includes transferring AC power from a second DC interconnection system to the healthy portion, wherein operation of the first DC interconnection system and the second DC interconnection system are coordinated so as to remove the overload condition from the second feeder line and prevent another overload condition from occurring within the third feeder line. In certain forms, the AC distribution network includes a tap changer, wherein transferring AC power to the first feeder line includes determining a coordinated solution for the tap changer and the DC interconnection system effective to eliminate the overload condition on the second feeder line, and generating control signals for the tap changer and DC interconnection system using the coordinated solution.

A further exemplary embodiment is a control system for an alternating current (AC) distribution network comprising: a processing device; a computer readable non-transitory medium including a set of instructions executable by the processing device effective to: operate a tie switch coupled between a first feeder line and a second feeder line of the AC distribution network; operate a DC interconnection system coupled to a third feeder line; isolate a faulted portion of the first feeder line from a healthy portion of the second feeder line; close the tie switch in response to isolating the faulted portion from the healthy portion; determine the second feeder line is experiencing an overload condition after closing the tie switch; and transfer AC power to the first feeder line including transferring AC power from the third feeder line using a DC interconnection system effective to reduce a magnitude of the overload condition from the second feeder line.

In certain forms of the foregoing control system, the tie switch is coupled in parallel with a second DC interconnection system structured to control reactive power between the healthy portion and the first feeder line while the tie switch is closed. In certain forms, the healthy portion is coupled to a plurality of tie switching devices, and wherein closing the tie switch includes selecting the tie switch using a calculated headroom value for the second feeder line or a circuit breaker status. In certain forms, detecting the overload condition includes determining a rated current of a segment of the second feeder line is exceeded by a current flowing through the segment, and wherein transferring AC power includes receiving the AC power with the first feeder line effective to reduce the current flowing through the segment to a current magnitude less than the rated current. In certain forms, transferring AC power includes determining a set point for the DC interconnection system using a plurality of headroom values each corresponding to points on at least one of the first feeder line and second feeder line, or wherein transferring AC power includes determining a set point for the DC interconnection system using a voltage profile each corresponding to voltages at points on at least one of the first feeder line and second feeder line. In certain forms, transferring AC power to the first feeder line includes transferring AC power from a second DC interconnection system to the healthy portion, wherein operation of the first DC interconnection system and the second DC interconnection system are coordinated so as to remove the overload condition from the second feeder line and prevent another overload condition from occurring within the third feeder line. In certain forms, the AC distribution network includes a tap changer, wherein transferring AC power to the first feeder line includes determining a coordinated solution for the tap changer and the DC interconnection system effective to eliminate the overload condition on the second feeder line, and generating control signals for the tap changer and DC interconnection system using the coordinated solution.

It is contemplated that the various aspects, features, processes, and operations from the various embodiments may be used in any of the other embodiments unless expressly stated to the contrary. Certain operations illustrated may be implemented by a computer executing a computer program product on a non-transient, computer-readable storage medium, where the computer program product includes instructions causing the computer to execute one or more of the operations, or to issue commands to other devices to execute one or more operations.

While the present disclosure has been illustrated and described in detail in the drawings and foregoing description, the same is to be considered as illustrative and not restrictive in character, it being understood that only certain exemplary embodiments have been shown and described, and that all changes and modifications that come within the spirit of the present disclosure are desired to be protected. It should be understood that while the use of words such as "preferable," "preferably," "preferred" or "more preferred" utilized in the description above indicate that the feature so described may be more desirable, it nonetheless may not be necessary, and embodiments lacking the same may be contemplated as within the scope of the present disclosure, the scope being defined by the claims that follow. In reading the claims, it is intended that when words such as "a," "an," "at least one," or "at least one portion" are used there is no intention to limit the claim to only one item unless specifically stated to the contrary in the claim. The term "of" may connote an association with, or a connection to, another item, as well as a belonging to, or a connection with, the other item as informed by the context in which it is used. The terms "coupled to," "coupled with" and the like include indirect connection and coupling, and further include but do not require a direct coupling or connection unless expressly indicated to the contrary. When the language "at least a portion" and/or "a portion" is used, the item can include a portion and/or the entire item unless specifically stated to the contrary.

What is claimed is:

1. A method for operating an alternating current (AC) distribution network including a first feeder line, a second feeder line, and a third feeder line, the method comprising:
   isolating a faulted portion of the first feeder line from a healthy portion of the first feeder line;
   closing a tie switch coupled between the healthy portion and the second feeder line in response to isolating the faulted portion from the healthy portion;
   determining the second feeder line is experiencing an overload condition after closing the tie switch; and
   transferring AC power from the third feeder line using a DC interconnection system coupled to the third feeder line effective to reduce a magnitude of the overload condition of the second feeder line.

2. The method of claim 1 wherein the tie switch is coupled in parallel with a second DC interconnection system including two AC/DC power converters structured to control reactive power between the healthy portion and the second feeder line while the tie switch is closed.

3. The method of claim 1 wherein the healthy portion is coupled to a plurality of tie switching devices, and wherein closing the tie switch includes selecting the tie switch using a calculated headroom value for the second feeder line.

4. The method of claim 1 wherein determining the second feeder line is experiencing the overload condition includes determining a rated current of at least one line segment of the second feeder line is exceeded by a current flowing through the at least one line segment, and wherein transferring AC power includes receiving the AC power with the first feeder line effective to reduce the current flowing through the at least one line segment to a current magnitude less than the rated current.

5. The method of claim 1 wherein transferring AC power includes determining a set point for the DC interconnection system using a plurality of headroom values each corresponding to points on at least one of the first feeder line and second feeder line.

6. The method of claim 1 wherein transferring AC power includes determining a set point for the DC interconnection system using a voltage profile each corresponding to voltages at points on at least one of the first feeder line and second feeder line.

7. The method of claim 1 wherein transferring AC power to the first feeder line includes transferring AC power from a second DC interconnection system to the healthy portion, wherein operation of the first DC interconnection system and the second DC interconnection system are coordinated so as to remove the overload condition from the second feeder line and prevent another overload condition from occurring within third feeder line.

8. The method of claim 1 wherein the AC distribution network includes a tap changer, wherein transferring AC power to the first feeder line includes determining a coordinated solution for the tap changer and the DC interconnection system effective to eliminate the overload condition on the second feeder line, and generating control signals for the tap changer and DC interconnection system using the coordinated solution.

9. An alternating current (AC) distribution network comprising:
   a first feeder line;
   a second feeder line;
   a third feeder line;
   a tie switch coupled between the first feeder line and the second feeder line;
   a DC interconnection system coupled to the third feeder line; and
   a control system structured to isolate a faulted portion of the first feeder line from a healthy portion of the first feeder line, close the tie switch in response to isolating the faulted portion from the healthy portion, detect an overload condition on a segment of the second feeder line; and transfer AC power from the third feeder line using the DC interconnection system effective to reduce a magnitude of the overload condition of the segment of the second feeder line.

10. The AC distribution network of claim 9 wherein the tie switch is coupled in parallel with a second DC interconnection system structured to control reactive power between the healthy portion and the first feeder line while the tie switch is closed.

11. The AC distribution network of claim 9 wherein the healthy portion is coupled to a plurality of tie switching devices, and wherein closing the tie switch includes selecting the tie switch using a calculated headroom value for the second feeder line or a circuit breaker status.

12. The AC distribution network of claim 9 wherein detecting the overload condition includes determining a rated current of the segment of the second feeder line is exceeded by a current flowing through the segment, and wherein transferring AC power includes receiving the AC power with the first feeder line effective to reduce the current flowing through the segment to a current magnitude less than the rated current.

13. The AC distribution network of claim 9 wherein transferring AC power includes determining a set point for the DC interconnection system using a plurality of headroom values each corresponding to points on at least one of the first feeder line and second feeder line.

14. The AC distribution network of claim 9 wherein transferring AC power includes determining a set point for the DC interconnection system using a voltage profile each corresponding to voltages at points on at least one of the first feeder line and second feeder line.

15. The AC distribution network of claim 9 wherein transferring AC power to the first feeder line includes transferring AC power from a second DC interconnection system to the healthy portion, wherein operation of the first DC interconnection system and the second DC interconnection system are coordinated so as to remove the overload condition from the second feeder line and prevent another overload condition from occurring within the third feeder line.

16. The AC distribution network of claim 9 wherein the AC distribution network includes a tap changer, wherein transferring AC power to the first feeder line includes determining a coordinated solution for the tap changer and the DC interconnection system effective to eliminate the overload condition on the second feeder line, and generating control signals for the tap changer and DC interconnection system using the coordinated solution.

17. A control system for an alternating current (AC) distribution network comprising:
   a processing device;
   a computer readable non-transitory medium including a set of instructions executable by the processing device effective to:
      operate a tie switch coupled between a first feeder line and a second feeder line of the AC distribution network;

operate a DC interconnection system coupled to a third feeder line;

isolate a faulted portion of the first feeder line from a healthy portion of the second feeder line;

close the tie switch in response to isolating the faulted portion from the healthy portion;

determine the second feeder line is experiencing an overload condition after closing the tie switch; and transfer AC power to the first feeder line including transferring AC power from the third feeder line using a DC interconnection system effective to reduce a magnitude of the overload condition from the second feeder line.

18. The control system of claim 17 wherein the tie switch is coupled in parallel with a second DC interconnection system structured to control reactive power between the healthy portion and the first feeder line while the tie switch is closed.

19. The control system of claim 17 wherein the healthy portion is coupled to a plurality of tie switching devices, and wherein closing the tie switch includes selecting the tie switch using a calculated headroom value for the second feeder line or a circuit breaker status.

20. The control system of claim 17 wherein detecting the overload condition includes determining a rated current of a segment of the second feeder line is exceeded by a current flowing through the segment, and wherein transferring AC power includes receiving the AC power with the first feeder line effective to reduce the current flowing through the segment to a current magnitude less than the rated current.

21. The control system of claim 17 wherein transferring AC power includes determining a set point for the DC interconnection system using a plurality of headroom values each corresponding to points on at least one of the first feeder line and second feeder line, or wherein transferring AC power includes determining a set point for the DC interconnection system using a voltage profile each corresponding to voltages at points on at least one of the first feeder line and second feeder line.

22. The control system of claim 17 wherein transferring AC power to the first feeder line includes transferring AC power from a second DC interconnection system to the healthy portion, wherein operation of the first DC interconnection system and the second DC interconnection system are coordinated so as to remove the overload condition from the second feeder line and prevent another overload condition from occurring within the third feeder line.

23. The control system of claim 17 wherein the AC distribution network includes a tap changer, wherein transferring AC power to the first feeder line includes determining a coordinated solution for the tap changer and the DC interconnection system effective to eliminate the overload condition on the second feeder line, and generating control signals for the tap changer and DC interconnection system using the coordinated solution.

\* \* \* \* \*